(12) United States Patent  (10) Patent No.: US 7,804,652 B2
Saori  (45) Date of Patent: Sep. 28, 2010

(54) ZOOM LENS SYSTEM

(75) Inventor: Masakazu Saori, Saitama (JP)

(73) Assignee: Hoya Corporation, Tokyo (JP)

( * ) Notice: Subject to any disclaimer, the term of this patent is extended or adjusted under 35 U.S.C. 154(b) by 192 days.

(21) Appl. No.: 12/127,914

(22) Filed: May 28, 2008

(65) Prior Publication Data

US 2008/0297913 A1  Dec. 4, 2008

(30) Foreign Application Priority Data

May 30, 2007  (JP) .............................. 2007-143070

(51) Int. Cl.
G02B 15/14  (2006.01)
(52) U.S. Cl. ...................... 359/676; 359/690
(58) Field of Classification Search ................. 359/690, 359/676
See application file for complete search history.

(56) References Cited

U.S. PATENT DOCUMENTS

| 5,424,869 | A | * | 6/1995 | Nanjo | ......................... 359/687 |
| 5,930,051 | A | * | 7/1999 | Sato | ............................ 359/690 |
| 2003/0117717 | A1 | * | 6/2003 | Ohtake et al. | ............... 359/683 |
| 2004/0223230 | A1 | | 11/2004 | Saori | |
| 2005/0046961 | A1 | | 3/2005 | Saori | |
| 2005/0057819 | A1 | | 3/2005 | Eguchi | |
| 2005/0068636 | A1 | | 3/2005 | Hayakawa | |
| 2005/0275949 | A1 | | 12/2005 | Fujimoto et al. | |
| 2006/0203356 | A1 | | 9/2006 | Fujimoto et al. | |
| 2007/0047097 | A1 | | 3/2007 | Nakamura et al. | |
| 2007/0188888 | A1 | | 8/2007 | Saori | |
| 2007/0229985 | A1 | * | 10/2007 | Nakatani et al. | ............. 359/774 |
| 2007/0263295 | A1 | | 11/2007 | Enomoto | |

FOREIGN PATENT DOCUMENTS

| JP | 2004-233750 | 8/2004 |
| JP | 2004-354980 | 12/2004 |
| JP | 2005-107262 | 4/2005 |
| JP | 2005-352057 | 12/2005 |
| JP | 2006-227526 | 8/2006 |
| JP | 2006-234892 | 9/2006 |

OTHER PUBLICATIONS

English language Abstract of JP 2004-233750, Aug. 19, 2004.
English language Abstract of JP 2006-227526, Aug. 31, 2006.
English language Abstract of JP 2006-234892, Sep. 7, 2006.
U.S. Appl. No. 12/127,113 to Enomoto, filed May 27, 2008.

* cited by examiner

Primary Examiner—Jordan M. Schwartz
(74) Attorney, Agent, or Firm—Greenblum & Bernstein P.L.C.

(57) ABSTRACT

A zoom lens system includes a positive first lens group, a negative second lens group, and a rear lens group which is provided on the image side of the negative second lens group, and has a combined positive refractive power, in this order from the object; and the zoom lens system satisfies the following conditions:

$5.0 < f1/fw < 6.5$  (1)

$0.4 < fRt/ft < 0.55$  (2)

wherein f1 designates a focal length of the positive first lens group;

fw designates a focal length of the entire the zoom lens system at the short focal length extremity;

fRt designates a combined focal length of the positive rear lens group at the long focal length extremity; and ft designates a focal length of the entire zoom lens system at the long focal length extremity.

6 Claims, 9 Drawing Sheets

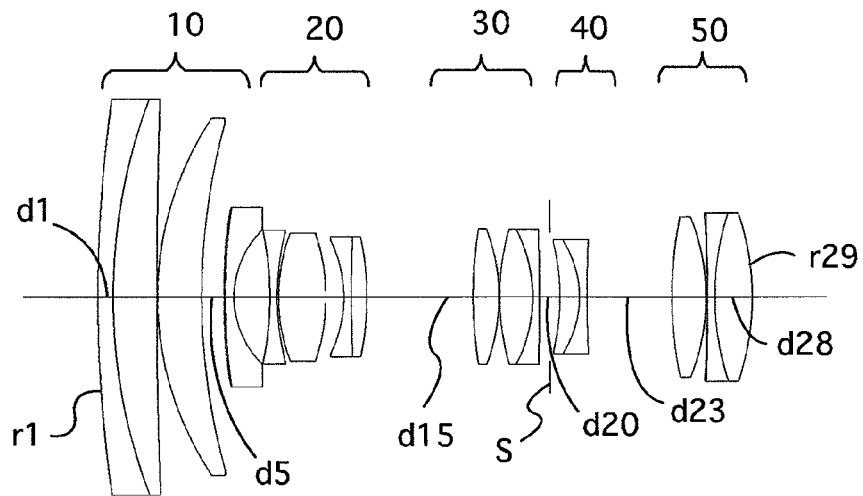
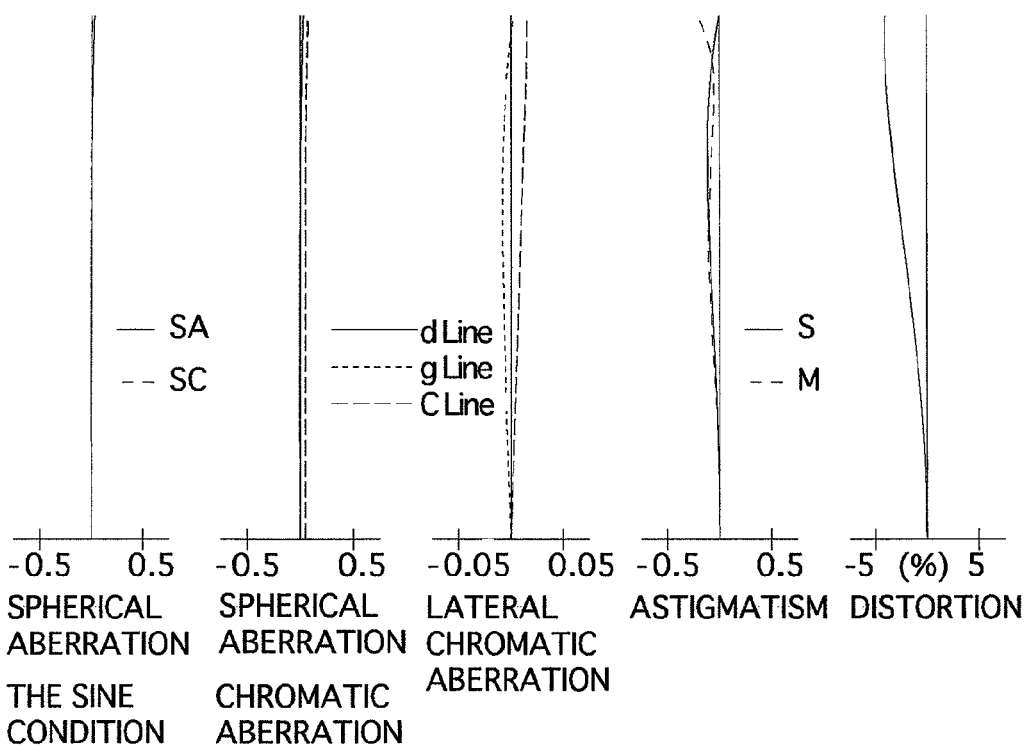

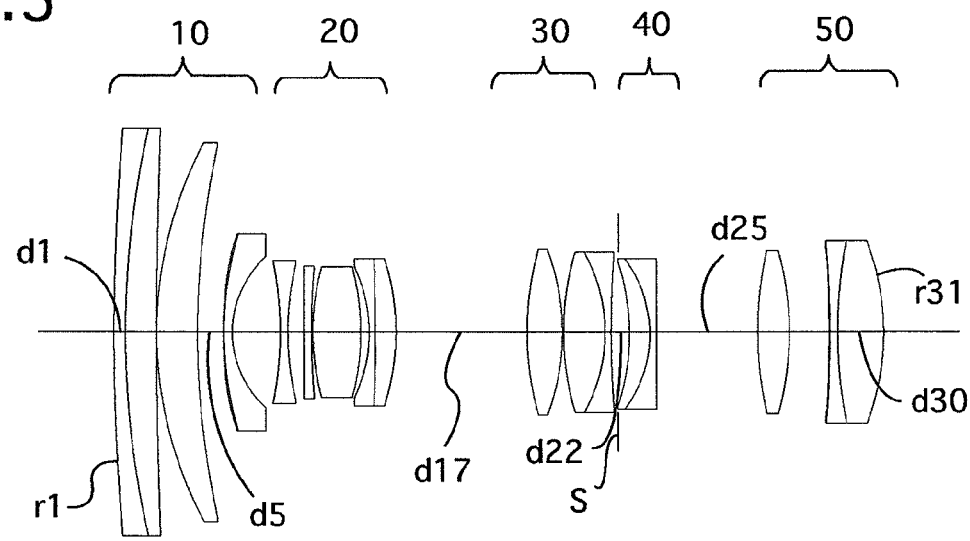
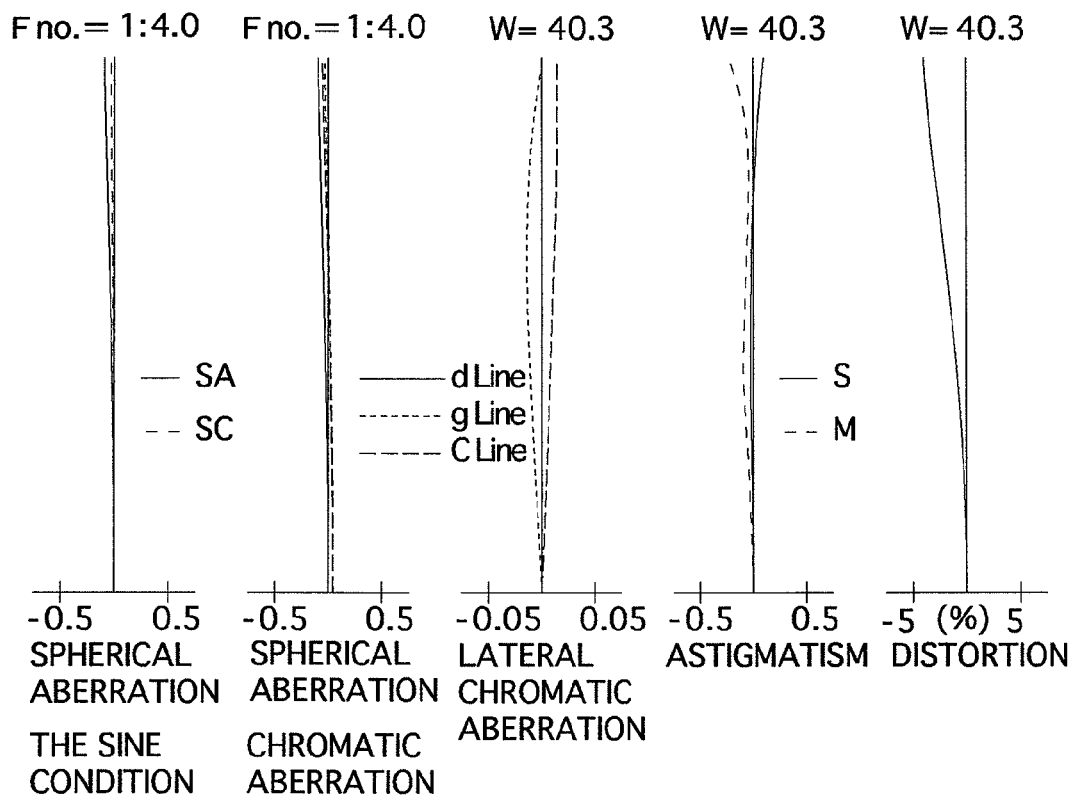

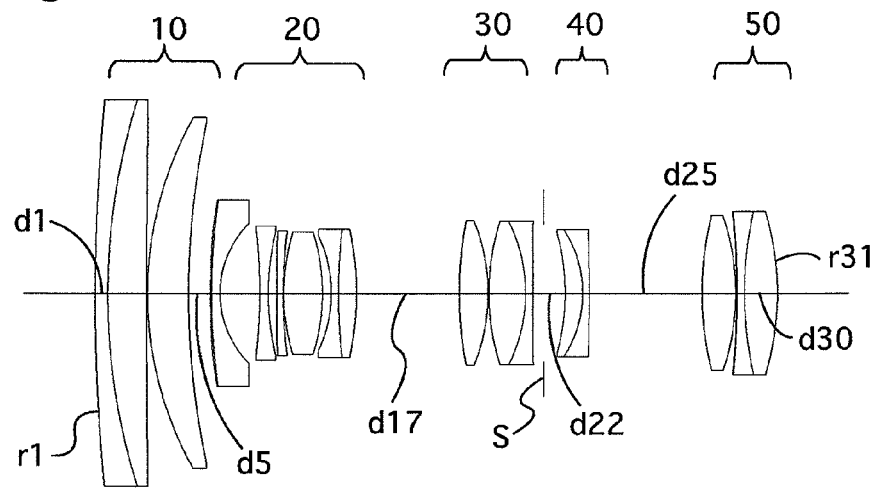
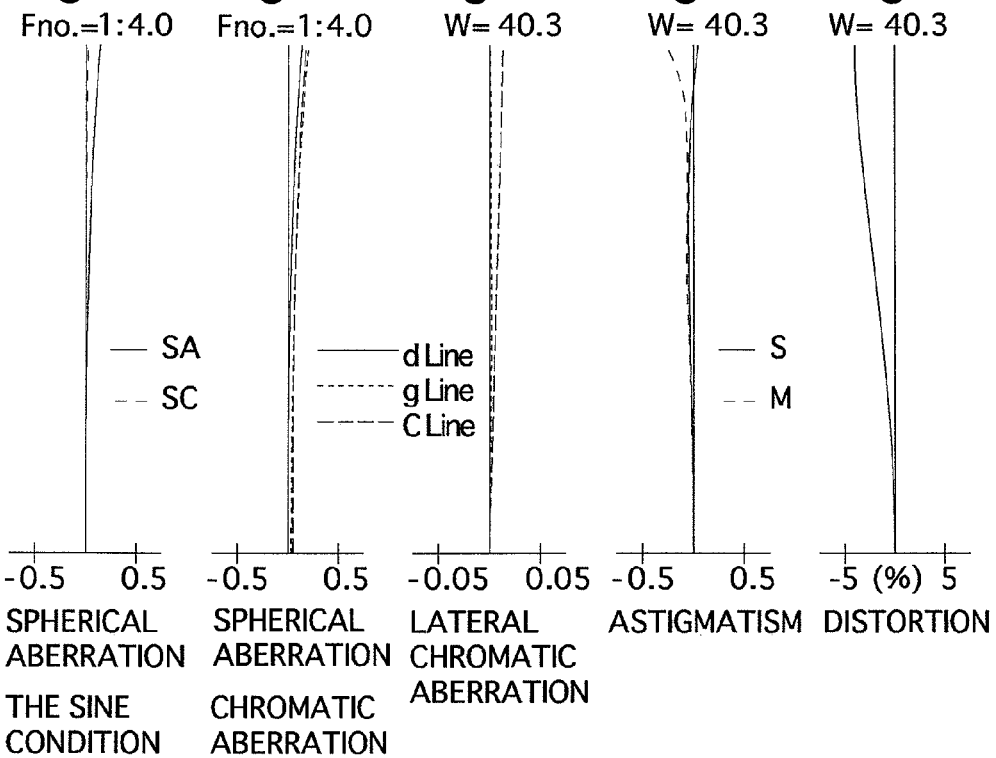

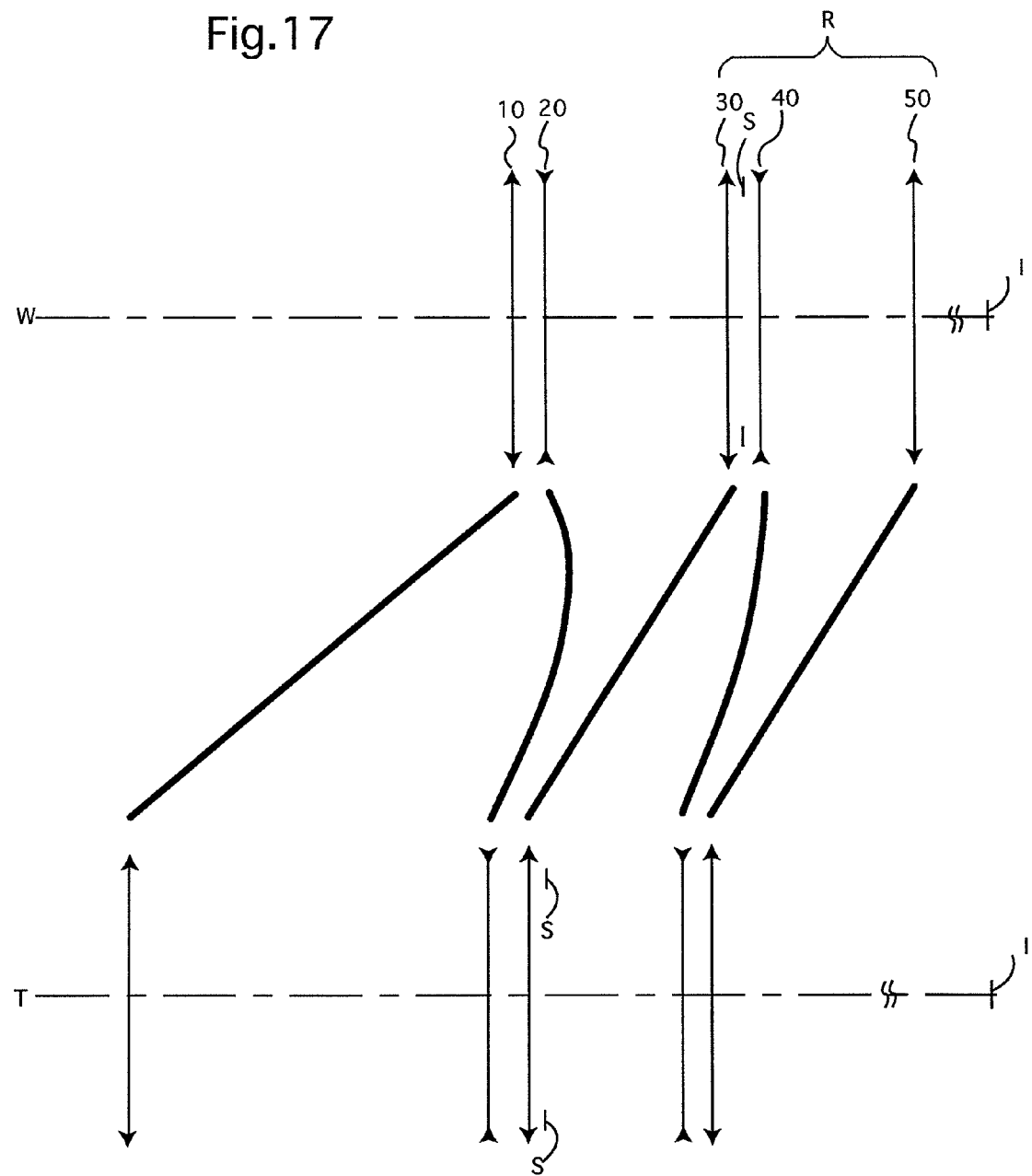

ZOOM LENS SYSTEM

BACKGROUND OF THE INVENTION

1. Field of the Invention

The present invention relates to a zoom lens system, for a single-lens reflex (SLR) camera, having a suitable zoom ratio of approximately 4, and having an angle-of-view of over 80° at the short focal length extremity.

2. Description of the Prior Art

As a zoom lens system, a negative-lead type zoom-lens system has generally been employed in the case where a zoom ratio of up to approximately 3 is required. If the zoom ratio exceeds approximately 4, a positive-lead type zoom-lens system including four or more lens groups has been employed.

However, a zoom lens system in which a zoom ratio, an angle-of-view, a smaller open F-number which does not vary upon zooming, and an optical quality thereof are well balanced has not been known.

For example, in Japanese Unexamined Patent Publication (JUPP) No. 2004-354980, a zoom lens system having four lens groups, i.e., a lens group having a negative refractive power (hereinafter, a negative lens group), a lens group having a positive refractive power (hereinafter, a positive lens group), a negative lens group, and a positive lens group, is proposed. The zoom lens system has an angle-of-view exceeding 80° at the short focal length extremity, and achieves an open F-number 4 (constant) over an entire range from the short focal length extremity to the long focal length extremity; however, the zoom ratio thereof is only a little under 3.

In JUPP No. 2005-107262, a zoom lens system having five lens groups, i.e., a positive lens group, a negative lens group, a positive lens group, a negative lens group, and a positive lens group, is proposed. The zoom lens system has the open F-number which varies in accordance with the focal length is large (i.e., 4.6) at the long focal length extremity. If an attempt is made to achieve an open F-number of 4, spherical aberration and coma are undercorrected.

In JUPP Nos. 2006-227526 and 2004-233750, zoom lens systems include five lens groups, i.e., a positive lens group, a negative lens group, a positive lens group, a negative lens group, and a positive lens group. The zoom lens systems have a zoom ratio exceeding 4, and have an angle-of-view exceeding 80° at the long focal length extremity; however, this angle-of-view is equivalent to the angle-of-view of an imaging device with the 35 mm-film-format size, and is not sufficient for a smaller imaging device. If an attempt is made to simply make the focal length of the zoom lens system shorter (scaling) in order to widen the angle-of-view, the back focal distance cannot be secured. Furthermore, in these publications, the open F-number which varies in accordance with the focal length is 4.8 and 5.9 at the telephoto extremity; however, these open F-numbers are too large from the viewpoint of the balance among the angle-of-view, the open F-number and an optical quality.

In JUPP No. 2006-234892, a zoom lens system includes five lens groups, i.e., a positive lens group, a negative lens group, a positive lens group, a negative lens group, and a positive lens group. An open F-number of 2.8 which does not vary in accordance with the focal length is sufficiently bright (fast); however, the zoom ratio is smaller, i.e., approximately 3. If the zoom ratio is increased, the correcting of spherical aberration and coma becomes difficult.

In JUPP No. 2005-352057, zoom lens systems include four to six lens groups with various refractive power distribution over the lens groups; and, an open F-number which varies in accordance with the focal length is approximately 5.8 at the long focal length extremity, which is large from the viewpoint of the balance among the angle-of-view, the open F-number and an optical quality. On the other hand, in the case where an open F-number which does not vary in accordance with the focal length is 4.1, a sufficient zoom ratio cannot be achieved.

SUMMARY OF THE INVENTION

The present invention is to provide a zoom lens system having the following features:

(i) an angle-of-view exceeding 80° at the short focal length extremity;

(ii) a zoom ratio of approximately 4;

(iii) an F-number of 4 at the long focal length extremity which can be maintained constant upon zooming; and (iv) superior optical quality.

According to an aspect of the present invention, there is provided a zoom lens system including a positive first lens group, a negative second lens group, and a rear lens group which is provided on the image side of the negative second lens group, and has a combined positive refractive power, in this order from the object; and the zoom lens system satisfies the following conditions:

$$5.0 < f1/fw < 6.5 \tag{1}$$

$$0.4 < fRt/ft < 0.55 \tag{2}$$

wherein f1 designates a focal length of the positive first lens group;

fw designates a focal length of the entire the zoom lens system at the short focal length extremity;

fRt designates a combined focal length of the positive rear lens group at the long focal length extremity; and ft designates a focal length of the entire zoom lens system at the long focal length extremity.

The positive rear lens group preferably includes a positive third lens group, a negative fourth lens group, and a positive fifth lens group, in this order from the object.

The zoom lens system preferably satisfies the following condition:

$$2.7 < f4/f2 < 4.5 \tag{3}$$

wherein f4 designate a focal lengths of the negative fourth lens group; and f2 designate a focal lengths of the negative second lens group.

The zoom lens system preferably satisfies the following condition:

$$2.0 < fBw/|f12w| < 2.5 \tag{4}$$

wherein fBw designates a back focal distance of the zoom lens system at the short focal length extremity; and f12w designates a combined focal length of the positive first lens group and the negative second lens group at the short focal length extremity (f12w<0).

The negative second lens group preferably includes six lens elements, i.e., a negative lens element, a negative lens element, a negative lens element, a positive lens element, a negative lens element, and a positive lens element, in this order from the object.

In the case where the positive rear lens group includes a positive third lens group, a negative fourth lens group, and a positive fifth lens group, in this order from the object, the positive fifth lens group preferably includes at least one lens element having an aspherical surface.

Likewise, in the case where the positive rear lens group includes a positive third lens group, a negative fourth lens group, and a positive fifth lens group, in this order from the object, it is preferable that the positive third lens group and the positive fifth lens group integrally move along the optical axis direction upon zooming.

The present disclosure relates to subject matter contained in Japanese Patent Application No. 2007-143070 (filed on May 30, 2007) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system, at the short focal length extremity, according to a first embodiment of the present invention;

FIGS. 2A, 2B, 2C, 2D and 2E show aberrations occurred in the lens arrangement shown in FIG. 1;

FIG. 5 is a lens arrangement of the zoom lens system, at the short focal length extremity, according to a second embodiment of the present invention;

FIGS. 6A, 6B, 6C, 6D and 6E show aberrations occurred in the lens arrangement shown in FIG. 5;

FIG. 9 is a lens arrangement of the zoom lens system, at the short focal length extremity, according to a third embodiment of the present invention;

FIGS. 10A, 10B, 10C, 10D and 10E show aberrations occurred in the lens arrangement shown in FIG. 9;

FIG. 17 is the schematic view of the lens-group moving paths for the zoom lens system according to the present invention.

DESCRIPTION OF THE PREFERRED EMBODIMENTS

Figure 3:
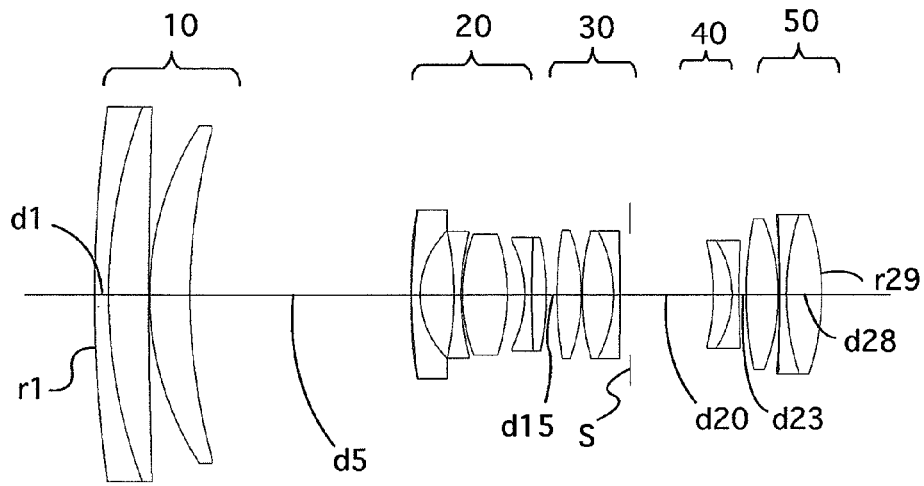
FIG. 3 is a lens arrangement of the zoom lens system, at the long focal length extremity, according to the first embodiment of the present invention.
Figures 4A, 4B, 4C, 4D, 4E:
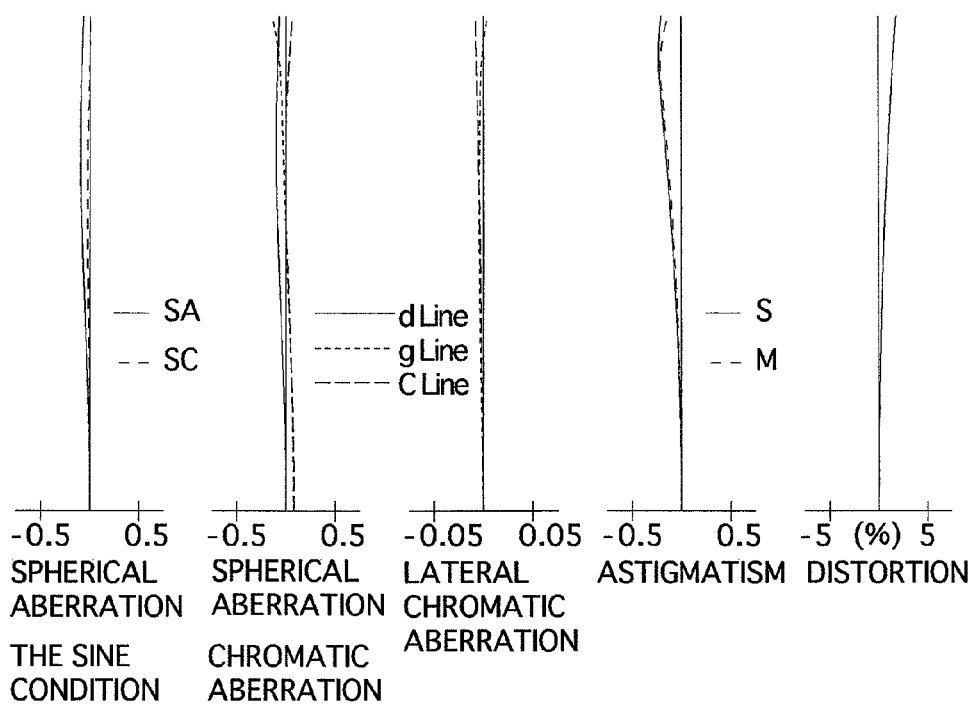
FIGS. 4A, 4B, 4C, 4D and 4E show aberrations occurred in the lens arrangement shown in FIG. 3.

A zoom lens system of the present invention, as shown in the zoom path of FIG. 17, includes a positive first lens group 10, a negative second lens group 20, and a positive rear lens group R, in this order from the object.

The positive rear lens group R includes a positive third lens group 30, a negative fourth lens group 40, and a positive fifth lens group 50, in this order from the object.

Upon zooming from the short focal length extremity (W) to the long focal length extremity (T), the lens groups other than the negative second lens group 20 move monotonically toward the object, and the negative second lens group 20 first moves toward the image and thereafter moves toward the object (in a U-turn movement).

Accordingly, the distance between the positive first lens group 10 and the negative second lens group 20 increases, and the distance between the negative second lens group 20 and the positive rear lens group R decreases.

In the case where the positive rear lens group R includes three lens groups, as mentioned above, upon zooming from the short focal length extremity (W) to the long focal length extremity (T), the distance between the positive third lens group 30 and the negative fourth lens group 40 increases, and the distance between the negative fourth lens group 40 and the positive fifth lens group 50 decreases.

A diaphragm S is provided, in the positive rear lens group R, between the positive third lens group 30 and the negative fourth lens group 40, as shown in FIG. 17, and moves integrally with the positive third lens group 30.

'I' designates the imaging plane.

In a zoom lens system, such as the one explained above, having a positive lens group, a negative lens group and a positive rear lens group R, in this order from the object, it is easy to achieve a zoom ratio of approximately 4. Furthermore, the correcting of aberrations becomes much more easier by moving the three lens groups of the positive rear lens group R so that the distance between the positive third lens group 30 and the negative fourth lens group 40 and the distance between the negative fourth lens group 40 and the positive fifth lens group 50 are arranged to vary upon zooming It is possible to integrally move the positive third lens group 30 with the fifth lens group 50; and in such a case, distance sensitivity of aberrations is reduced, so that manufacture of the zoom lens system can be easier.

Conditions (1) and (2) are for attaining an angle-of-view of 80° or more at the short focal length extremity, and for suitably correcting aberrations under the condition that a small open F-number is made constant with respect to the change in focal length.

Condition (1) specifies the ratio of the refractive power of the positive first lens group 10 to the refractive power of the entire zoom lens system at the short focal length extremity.

If f1/fw exceeds the lower limit of condition (1), the refractive power of the positive first lens group 10 becomes too strong. Consequently, the correcting of spherical aberration and coma becomes difficult at the long focal length extremity in particular.

If f1/fw exceeds the upper limit of condition (1), the refractive power of the positive first lens group 10 becomes too weak. Consequently, the traveling distance of the positive first lens group 10 in order to achieve a necessary zoom ratio becomes longer, while it is advantageous for securing a long back focal distance. Accordingly, a bundle of light rays which is to form an image at the periphery of the imaging plane passes through a portion of the positive first lens group 10 away from the optical axis, and hence, deterioration of aberrations at the periphery of the imaging plane, and fluctuations of aberration upon zooming become largely noticeable.

Condition (2) specifies the ratio of the combined refractive power of the positive rear lens group R (the positive third lens group 30, the negative fourth lens group 40, and the positive fifth lens group 50) at the long focal length extremity to the refractive power of the entire zoom lens system at the long focal length extremity.

If fRt/ft exceeds the lower limit of condition (2), the refractive power of the positive rear lens group R becomes too strong. Consequently, the correcting of spherical aberration and coma at the long focal length extremity becomes difficult.

If fRt/ft exceeds the upper limit of condition (2), the distance between the negative second lens group 20 and the positive rear lens group R has to be made longer in order to achieve a necessary zoom ratio; on the other hand, the traveling distance of the positive first lens group 10 becomes longer when a necessary back focal distance is secured. Accordingly, a bundle of light rays which is to form an image at the periphery of the imaging plane passes through a portion of the positive first lens group 10 away from the optical axis, and hence, deterioration of aberrations at the periphery of the imaging plane, and fluctuations of aberration upon zooming become largely noticeable.

Condition (3) specifies the ratio of the refractive power of the negative fourth lens group 40 to the refractive power of the negative second lens group 20 in the case where the positive rear lens group R is constituted by the positive lens group 30, the negative lens group 40, and the positive lens group 50, in this order from the object.

If f4/f2 exceeds the upper limit of condition (3), the refractive power of the negative fourth lens group 40 becomes too weak. Consequently, the correcting of aberrations in the positive third lens group 30 and the positive fifth lens group 50 (the positive lens groups of the rear lens group R) becomes insufficient, and fluctuations of aberration upon zooming become larger.

If f4/f2 exceeds the lower limit of condition (3), the refractive power of the negative second lens group 20 becomes too weak, so that the traveling distance of the positive first lens group 10 or the negative second lens group 20 has to be made longer. Accordingly, a bundle of light rays which is to form an image at the periphery of the imaging plane passes through a portion of the positive first lens group 10 away from the optical axis, and hence, deterioration of aberrations at the periphery of the imaging plane, and fluctuations of aberration upon zooming become largely noticeable.

Condition (4) specifies the ratio of the back focal distance at the short focal length extremity to the combined negative refractive power of the positive first lens group 10 and the negative second lens group 20.

If fBw/|f12w| exceeds the lower limit of condition (4), the combined negative refractive power of the positive first lens group 10 and the negative second lens group 20 becomes weaker, so that a sufficient angle-of-view cannot be achieved. On the other hand, if an attempt is made to achieve a sufficient angle-of-view, the traveling distance of the positive first lens group 10 or the negative second lens group 20 has to be made longer. However, fluctuations of aberration due to zooming become noticeable, so that the correcting of aberrations over the entire focal-length range becomes difficult.

If fBw/|f12w| exceeds the upper limit of condition (4), the combined negative refractive power of the positive first lens group 10 or the negative second lens group is stronger 20, so that the correcting of aberration becomes difficult.

In the zoom lens system of the present invention, the negative second lens group 20 preferably includes six lens elements, i.e., three negative lens elements, a positive lens element, a negative lens element and a positive lens element, in this order from the object. By increasing the number of negative lens elements in the negative second lens group 20, aberrations can be corrected in the case where the focal length of the zoom lens system at the short focal length extremity is made shorter, which can also contribute to an improvement in optical quality in photography at a closer distance.

Furthermore, by utilizing an aspherical lens element in the positive fifth lens group 50, coma in particular can suitably be corrected.

Specific numerical data of the embodiments will be described hereinafter.

In the diagrams of spherical aberration and the sine condition, SA designates spherical aberration, SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the tables, FNO. designates the F-number, f designates the focal length of the entire zoom lens system, W designates the half angle-of-view (°), fB designates the back focal distance, r designates the radius of curvature, d designates the lens-element thickness or a distance between lens elements (lens groups), $N_d$ designates the refractive index of the d-line, and v designates the Abbe number.

The values of the F-number, the focal length of the entire zoom lens system (f), the half angle-of-view (°) (W) and the back focal distance (fB), and the values of the lens-element thickness or a distance between lens elements (lens groups) (d) are indicated in the order of the short focal length extremity, an intermediate focal length and the long focal length extremity.

In addition to the above, an aspherical surface which is symmetrical with respect to the optical axis is defined as follows:

$$x=cy^2/[1+\{1-(1+K)c^2y^2\}^{1/2}]+A4y^4+A6y^6+A8y^8+A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

FIG. 1 is the lens arrangement of the zoom lens system, at the short focal length extremity, according to the first embodiment of the present invention. FIGS. 2A through 2E show aberrations occurred in the lens arrangement shown in FIG. 1.

FIG. 3 is the lens arrangement of the zoom lens system, at the long focal length extremity, according to the first embodiment of the present invention. FIGS. 4A through 4E show aberrations occurred in the lens arrangement shown in FIG. 3.

Table 1 shows the numerical data of the first embodiment.

The zoom lens system of the first embodiment includes a positive first lens group 10, a negative second lens group 20, and a positive rear lens group R (a positive third lens group 30, a negative fourth lens group 40, and a positive fifth lens group 50), in this order from the object.

The positive first lens group 10 includes cemented lens elements, i.e., a negative meniscus lens element having the convex surface facing toward the object and a positive meniscus lens element having the convex surface facing toward the object, and a positive meniscus lens element having the convex surface facing toward the object, in this order from the object.

The negative second lens group 20 includes a negative meniscus lens element having the convex surface facing toward the object to which a resin aspherical layer is bonded, a biconcave negative lens element, a biconvex positive lens element, and cemented lens elements having a biconcave negative lens element and a biconvex positive lens element, in this order from the object.

The positive third lens group 30 includes a biconvex positive lens element, and cemented lens elements having a biconvex positive lens element and a negative meniscus lens element having the convex surface facing toward the image, in this order from the object.

The negative fourth lens group 40 includes cemented lens elements having a positive meniscus lens element having the convex surface facing toward the image and a biconcave negative lens element, in this order from the object.

The positive fifth lens group 50 includes a biconvex positive lens element, and cemented lens elements having a planoconcave negative lens element to which a resin aspherical layer is bonded on the object-side plano-surface and a biconvex positive lens element, in this order from the object.

A diaphragm S is provided 1.41 behind the positive third lens group 30 (surface No. 20).

TABLE 1

FNO. = 1:4.0-4.0-4.0
f = 17.50-35.00-67.99 (Zoom Ratio = 3.88)
W = 40.3-21.8-11.6
fB = 38.50-46.89-59.72

| Surf. No. | r | d | Nd | ν |
|---|---|---|---|---|
| 1 | 191.132 | 2.00 | 1.84666 | 23.8 |
| 2 | 75.362 | 5.80 | 1.71300 | 53.9 |
| 3 | 768.741 | 0.10 | | |
| 4 | 43.536 | 5.81 | 1.77250 | 49.6 |
| 5 | 88.653 | 3.00-18.13-31.43 | | |
| 6* | 164.670 | 0.10 | 1.52700 | 43.7 |
| 7 | 82.045 | 1.20 | 1.83481 | 42.7 |
| 8 | 12.616 | 4.85 | | |
| 9 | −42.347 | 1.00 | 1.88300 | 40.8 |
| 10 | 35.127 | 0.20 | | |
| 11 | 24.249 | 6.31 | 1.67503 | 31.7 |
| 12 | −27.153 | 2.49 | | |
| 13 | −16.836 | 1.00 | 1.80400 | 46.6 |
| 14 | 196.716 | 2.09 | 1.80518 | 25.4 |
| 15 | −37.147 | 14.24-6.36-1.51 | | |
| 16 | 54.715 | 3.52 | 1.53768 | 47.7 |
| 17 | −25.362 | 0.10 | | |
| 18 | 32.221 | 4.50 | 1.62365 | 57.3 |
| 19 | −19.303 | 0.90 | 1.80518 | 25.4 |
| 20 | −411.135 | 2.81-9.08-13.24 | | |
| 21 | −30.000 | 2.66 | 1.84665 | 23.8 |
| 22 | −13.918 | 1.00 | 1.79775 | 47.8 |
| 23 | 182.357 | 11.43-5.16-1.00 | | |
| 24 | 52.478 | 4.62 | 1.48749 | 70.2 |
| 25 | −28.189 | 0.10 | | |
| 26* | ∞ | 0.10 | 1.52972 | 42.7 |
| 27 | −308.104 | 1.00 | 1.80500 | 25.4 |
| 28 | 36.393 | 5.09 | 1.48749 | 70.2 |
| 29 | −33.975 | — | | |

The symbol * designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| No. 6 | 0.0 | $0.31693 \times 10^{-4}$ | $-0.82015 \times 10^{-7}$ | $0.17907 \times 10^{-9}$ |
| No. 26 | 0.0 | $-0.19784 \times 10^{-4}$ | $-0.16272 \times 10^{-7}$ | |

Embodiment 2

FIG. 5 is the lens arrangement of the zoom lens system, at the short focal length extremity, according to the second embodiment of the present invention. FIGS. 6A through 6E show aberrations occurred in the lens arrangement shown in FIG. 5.

Figure 7:
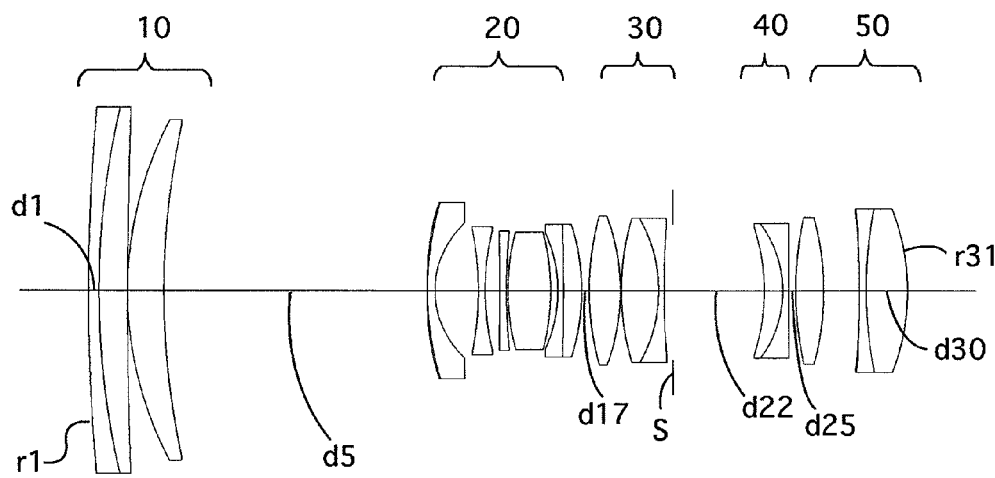
FIG. 7 is a lens arrangement of the zoom lens system, at the long focal length extremity, according to the second embodiment of the present invention.
Figures 8A, 8B, 8C, 8D, 8E:
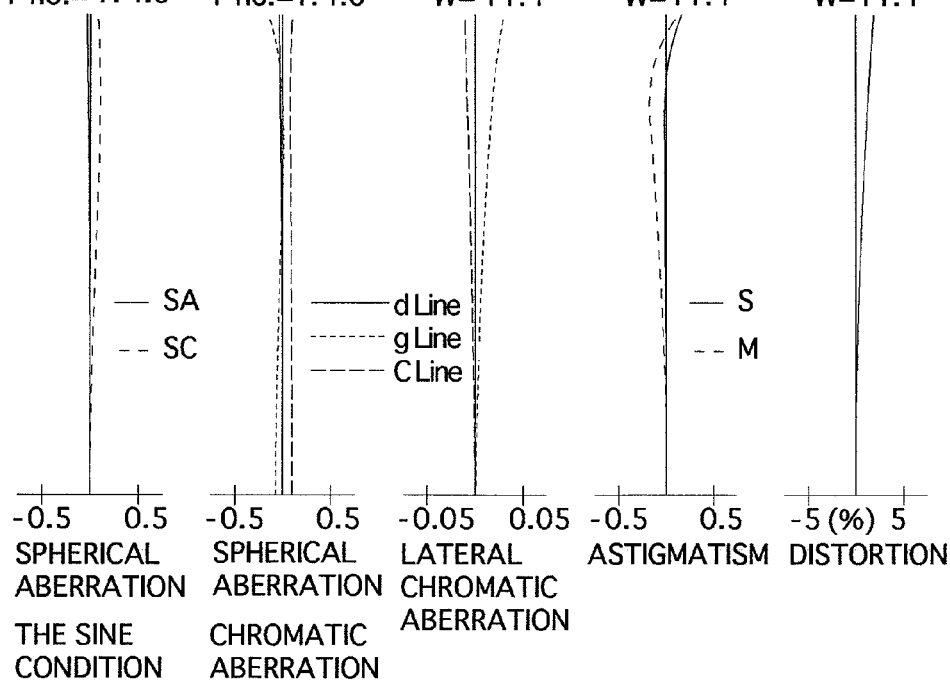
FIGS. 8A, 8B, 8C, 8D and 8E show aberrations occurred in the lens arrangement shown in FIG. 7.

FIG. 7 is the lens arrangement of the zoom lens system, at the long focal length extremity, according to the second embodiment of the present invention. FIGS. 8A through 8E show aberrations occurred in the lens arrangement shown in FIG. 7.

Table 2 shows the numerical data of the second embodiment.

The basic lens arrangement of the second embodiment is the same as that of the first embodiment except for the following:

(1) in the negative second lens group 20, the third lens element from the object is a negative biconcave lens element; and the image-side cemented lens elements includes a negative lens element having a convex surface facing toward the image and a positive lens element having a convex surface facing toward the image, in this order from the object.

(2) in the positive third lens group 30, the most image-side lens element is a negative biconcave lens element;

(3) in the negative fourth lens group 40, the image-side lens element is a negative meniscus lens element having the convex surface facing toward the image; and (5) in the positive fifth lens group 50, the middle lens element among the three lens elements is a negative biconcave lens element on which a resin aspherical layer is bonded.

The diaphragm S is provided 1.00 behind the positive third lens group 30 (surface No. 22).

TABLE 2

FNO. = 1:4.0-4.0-4.0
f = 17.50-35.00-69.00 (Zoom Ratio = 3.94)
W = 40.3-21.8-11.4
fB = 42.78-56.05-76.08

| Surf. No. | r | d | Nd | ν |
|---|---|---|---|---|
| 1 | 310.096 | 1.50 | 1.84666 | 23.8 |
| 2 | 119.723 | 4.14 | 1.72916 | 54.7 |
| 3 | 737.256 | 0.00 | | |
| 4 | 52.605 | 5.38 | 1.77250 | 49.6 |
| 5 | 113.760 | 3.42-21.22-38.57 | | |
| 6* | 59.925 | 0.10 | 1.52700 | 43.7 |
| 7 | 45.677 | 1.10 | 1.80400 | 46.6 |
| 8 | 13.475 | 6.33 | | |
| 9 | −46.675 | 1.00 | 1.80400 | 46.6 |
| 10 | 37.675 | 2.12 | | |
| 11 | −954.063 | 1.00 | 1.82132 | 44.8 |
| 12 | 100.156 | 0.20 | | |
| 13 | 32.967 | 6.26 | 1.59500 | 35.2 |
| 14 | −32.967 | 1.09 | | |
| 15 | −20.204 | 0.80 | 1.80400 | 46.6 |
| 16 | −286.014 | 2.69 | 1.78472 | 25.7 |
| 17 | −31.454 | 17.44-7.24-1.10 | | |

TABLE 2-continued

FNO. = 1:4.0-4.0-4.0
f = 17.50-35.00-69.00 (Zoom Ratio = 3.94)
W = 40.3-21.8-11.4
fB = 42.78-56.05-76.08

| Surf. No. | r | d | Nd | ν |
|---|---|---|---|---|
| 18 | 39.867 | 4.64 | 1.53948 | 47.3 |
| 19 | −30.495 | 0.15 | | |
| 20 | 36.172 | 5.52 | 1.55849 | 56.4 |
| 21 | −21.337 | 0.80 | 1.80499 | 25.4 |
| 22 | 133.220 | 2.57-10.19-14.81 | | |
| 23 | −30.001 | 2.73 | 1.84666 | 23.8 |
| 24 | −16.312 | 0.90 | 1.77121 | 48.6 |
| 25 | −3895.535 | 13.23-5.62-1.00 | | |
| 26 | 48.357 | 4.14 | 1.49700 | 81.6 |
| 27 | −39.026 | 5.15 | | |
| 28* | −441.970 | 0.13 | 1.52972 | 42.7 |
| 29 | −137.716 | 1.00 | 1.77314 | 26.6 |
| 30 | 62.979 | 6.00 | 1.48749 | 70.2 |
| 31 | −33.116 | — | | |

The symbol * designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| No. 6 | 0.0 | $0.20935 \times 10^{-4}$ | $-0.59094 \times 10^{-7}$ | $0.15610 \times 10^{-9}$ |
| No. 28 | 0.0 | $-0.16925 \times 10^{-4}$ | $-0.10702 \times 10^{-7}$ | |

Embodiment 3

FIG. 9 is the lens arrangement of the zoom lens system, at the short focal length extremity, according to the third embodiment of the present invention. FIGS. 10A through 10E show aberrations occurred in the lens arrangement shown in FIG. 9.

Figures 11, 12A, 12B, 12C, 12D, 12E:
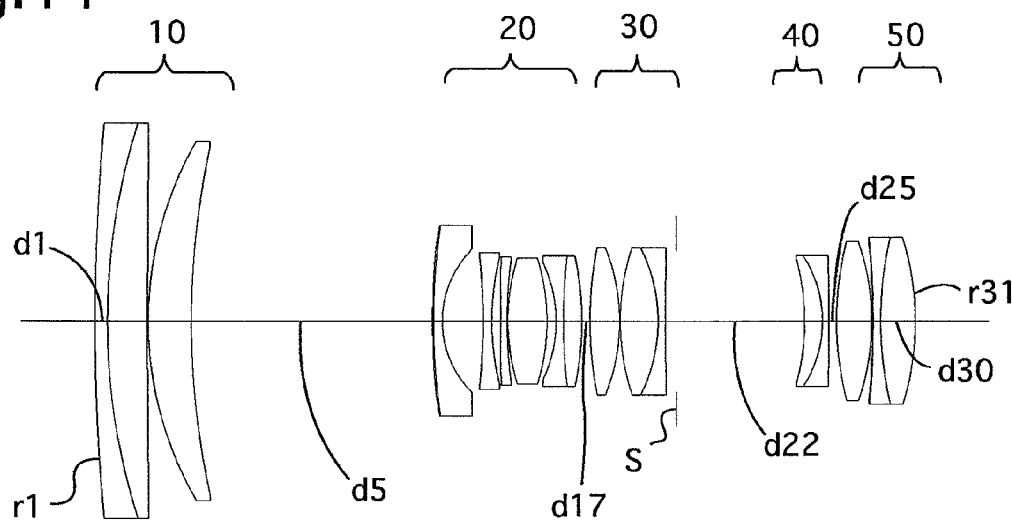
FIG. 11 is a lens arrangement of the zoom lens system, at the long focal length extremity, according to the third embodiment of the present invention.
FIGS. 12A, 12B, 12C, 12D and 12E show aberrations occurred in the lens arrangement shown in FIG. 11.

FIG. 11 is the lens arrangement of the zoom lens system, at the long focal length extremity, according to the third embodiment of the present invention. FIGS. 12A through 12E show aberrations occurred in the lens arrangement shown in FIG. 11.

Table 3 shows the numerical data of the third embodiment.

The basic lens arrangement of the third embodiment is the same as that of the second embodiment except for the following:

in the negative second lens group 20, the third lens element from the object is a negative meniscus lens element having the convex surface facing toward the object; and the image-side cemented lens elements includes a biconcave negative lens element and a biconvex positive lens element, in this order from the object.

The diaphragm S is provided 1.41 behind the positive third lens group 30 (surface No. 22).

TABLE 3

FNO. = 1:4.0-4.0-4.0
f = 17.50-35.00-67.90 (Zoom Ratio = 3.88)
W = 40.3-21.7-11.6
fB = 39.32-50.42-68.71

| Surf. No. | r | d | Nd | ν |
|---|---|---|---|---|
| 1 | 283.388 | 1.70 | 1.84666 | 23.8 |
| 2 | 88.336 | 5.44 | 1.71300 | 53.9 |

TABLE 3-continued

FNO. = 1:4.0-4.0-4.0
f = 17.50-35.00-67.90 (Zoom Ratio = 3.88)
W = 40.3-21.7-11.6
fB = 39.32-50.42-68.71

| Surf. No. | r | d | Nd | ν |
|---|---|---|---|---|
| 3 | 1998.645 | 0.10 | | |
| 4 | 49.085 | 5.72 | 1.78800 | 47.4 |
| 5 | 112.966 | 3.07-19.07-32.66 | | |
| 6* | 179.910 | 0.10 | 1.52700 | 43.7 |
| 7 | 86.849 | 1.20 | 1.80400 | 46.6 |
| 8 | 13.680 | 5.55 | | |
| 9 | −81.538 | 1.20 | 1.80500 | 46.5 |
| 10 | 35.887 | 1.18 | | |
| 11 | 460.923 | 0.90 | 1.83391 | 43.7 |
| 12 | 64.065 | 0.10 | | |
| 13 | 28.390 | 5.40 | 1.59500 | 35.2 |
| 14 | −28.155 | 1.25 | | |
| 15 | −18.354 | 1.00 | 1.78800 | 47.4 |
| 16 | 79.482 | 2.51 | 1.78455 | 25.6 |
| 17 | −41.133 | 14.27-6.11-1.10 | | |
| 18 | 51.005 | 3.99 | 1.53188 | 48.9 |
| 19 | −26.308 | 0.10 | | |
| 20 | 31.773 | 5.09 | 1.56640 | 60.7 |
| 21 | −22.139 | 1.00 | 1.80499 | 26.4 |
| 22 | 917.388 | 4.38-13.52-18.97 | | |
| 23 | −31.947 | 2.39 | 1.84666 | 23.8 |
| 24 | −16.426 | 0.90 | 1.80400 | 46.6 |
| 25 | −252.360 | 15.58-6.45-1.00 | | |
| 26 | 42.997 | 4.73 | 1.48749 | 70.2 |
| 27 | −32.344 | 0.10 | | |
| 28* | −223.424 | 0.10 | 1.52972 | 42.7 |
| 29 | −117.023 | 1.00 | 1.80500 | 25.5 |
| 30 | 50.219 | 4.65 | 1.48749 | 70.2 |
| 31 | −38.084 | — | | |

The symbol * designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| No. 6 | 0.0 | $0.25587 \times 10^{-4}$ | $-0.66485 \times 10^{-7}$ | $0.13112 \times 10^{-9}$ |
| No. 28 | 0.0 | $-0.19974 \times 10^{-4}$ | $-0.12441 \times 10^{-7}$ | |

Embodiment 4

Figure 13:
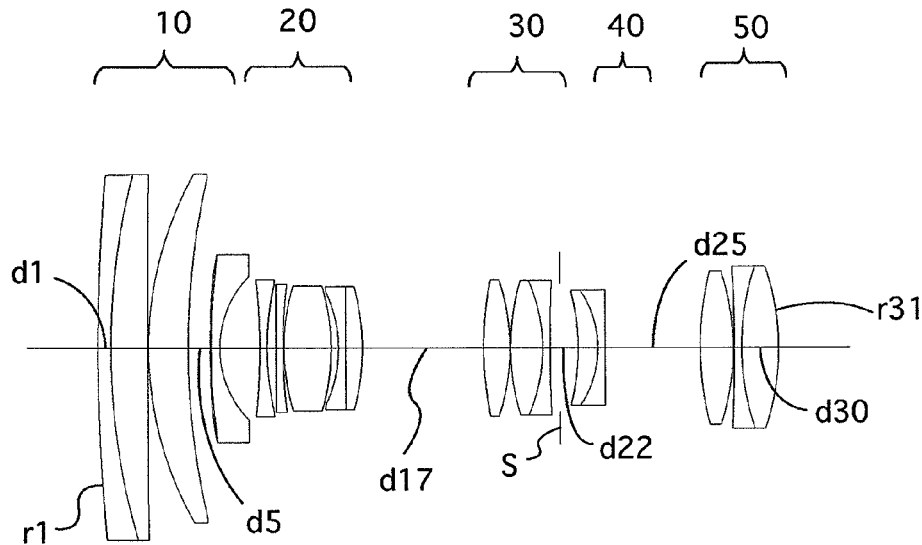
FIG. 13 is a lens arrangement of the zoom lens system, at the short focal length extremity, according to a fourth embodiment of the present invention.
Figures 14A, 14B, 14C, 14D, 14E:
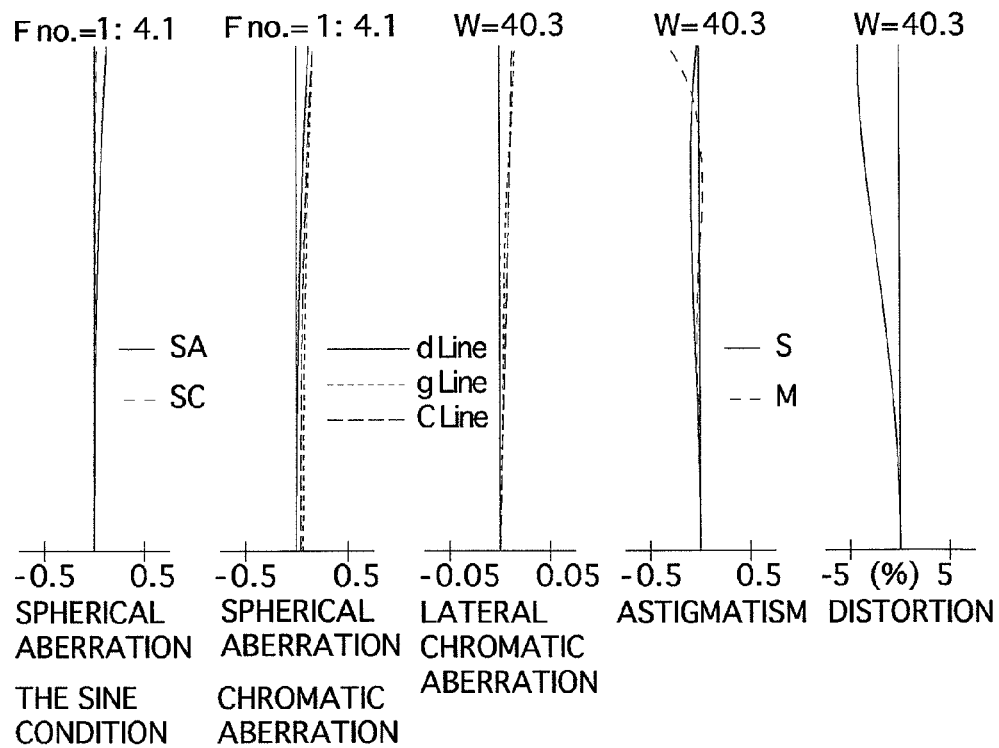
FIGS. 14A, 14B, 14C, 14D and 14E show aberrations occurred in the lens arrangement shown in FIG. 13.

FIG. 13 is the lens arrangement of the zoom lens system, at the short focal length extremity, according to the fourth embodiment of the present invention. FIGS. 14A through 14E show aberrations occurred in the lens arrangement shown in FIG. 13.

Figure 15:
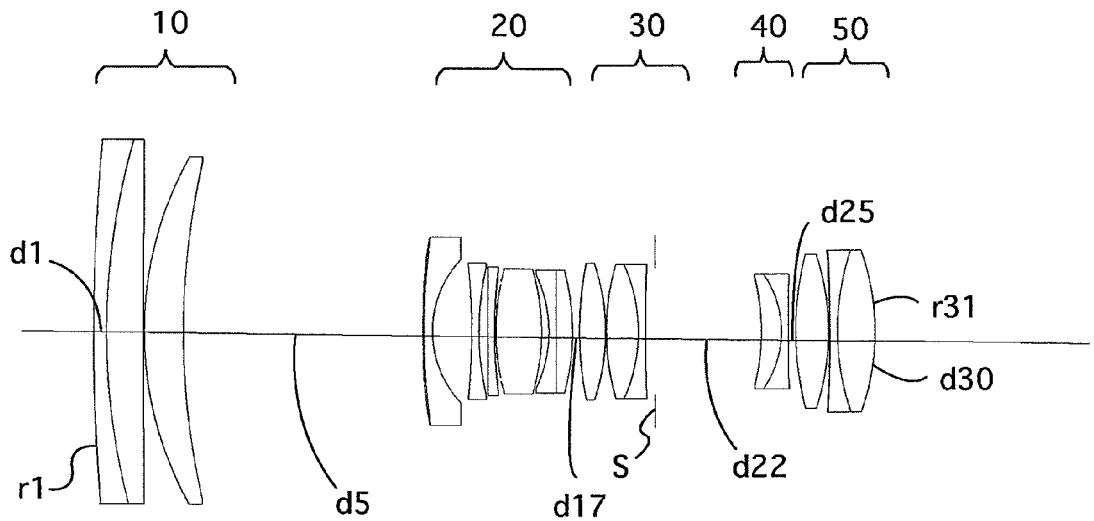
FIG. 15 is a lens arrangement of the zoom lens system, at the long focal length extremity, according to the fourth embodiment of the present invention.
Figures 16A, 16B, 16C, 16D, 16E:
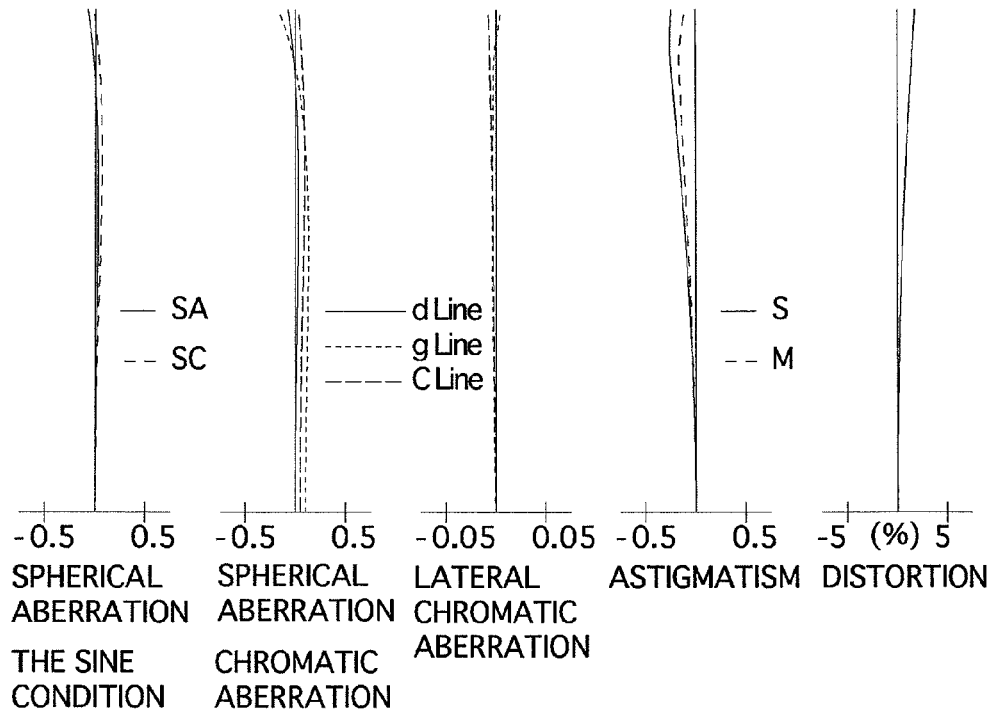
FIGS. 16A, 16B, 16C, 16D and 16E show aberrations occurred in the lens arrangement shown in FIG. 15.

FIG. 15 is the lens arrangement of the zoom lens system, at the long focal length extremity, according to the fourth embodiment of the present invention. FIGS. 16A through 16E show aberrations occurred in the lens arrangement shown in FIG. 15.

Table 4 shows the numerical data of the fourth embodiment.

The basic arrangement of the fourth embodiment is the same as that of the second embodiment except for the following:

(1) in the negative second lens group 20, the image-side cemented lens elements include a biconcave negative lens element and a biconvex positive lens element; and (2) in the negative fourth lens group 40, the image-side lens element is a biconcave negative lens element.

The diaphragm S is provided 1.41 behind the positive third lens group 30 (surface No. 22).

TABLE 4

FNO. = 1:4.1-4.1-4.1
f = 17.50-35.00-67.89 (Zoom Ratio = 3.87)
W = 40.3-21.8-11.6
fB = 39.04-49.45-64.38

| Surf. No. | r | d | Nd | ν |
|---|---|---|---|---|
| 1 | 285.090 | 1.80 | 1.84666 | 23.8 |
| 2 | 96.239 | 5.19 | 1.71300 | 53.9 |
| 3 | 3559.161 | 0.10 | | |
| 4 | 49.493 | 5.49 | 1.77250 | 49.6 |
| 5 | 106.028 | 3.10-18.13-33.70 | | |
| 6* | 199.217 | 0.10 | 1.52700 | 43.7 |
| 7 | 94.524 | 1.20 | 1.80400 | 46.6 |
| 8 | 14.703 | 5.47 | | |
| 9 | −91.784 | 1.00 | 1.80400 | 46.6 |
| 10 | 40.312 | 1.27 | | |
| 11 | −792.605 | 0.90 | 1.83400 | 37.2 |
| 12 | 72.794 | 0.15 | | |
| 13 | 30.191 | 6.49 | 1.59270 | 35.3 |
| 14 | −30.191 | 1.04 | | |
| 15 | −18.411 | 1.00 | 1.80400 | 46.6 |
| 16 | 1216.028 | 2.30 | 1.78472 | 25.7 |
| 17 | −33.130 | 16.92-6.68-1.00 | | |
| 18 | 48.029 | 3.67 | 1.56732 | 42.8 |
| 19 | −29.724 | 0.10 | | |
| 20 | 32.462 | 4.53 | 1.58913 | 61.2 |
| 21 | −22.857 | 1.00 | 1.80518 | 25.4 |
| 22 | 212.245 | 3.97-11.73-16.34 | | |
| 23 | −31.431 | 2.80 | 1.84666 | 23.8 |
| 24 | −14.123 | 1.00 | 1.80400 | 46.6 |
| 25 | 1587.500 | 13.39-5.62-1.00 | | |
| 26 | 43.935 | 4.56 | 1.48749 | 70.2 |
| 27 | −33.898 | 0.10 | | |
| 28* | −7107.317 | 0.10 | 1.52972 | 42.7 |
| 29 | −206.329 | 1.00 | 1.80518 | 25.4 |
| 30 | 35.460 | 5.23 | 1.48749 | 70.2 |
| 31 | −33.899 | — | | |

The symbol * designates the aspherical surface which is rotationally symmetrical with respect to the optical axis.

Aspherical surface data (the aspherical surface coefficients not indicated are zero (0.00)):

| Surf. | K | A4 | A6 | A8 |
|---|---|---|---|---|
| No. 6 | 0.0 | $0.23425 \times 10^{-4}$ | $-0.55109 \times 10^{-7}$ | $0.13114 \times 10^{-9}$ |
| No. 28 | 0.0 | $-0.19525 \times 10^{-4}$ | $-0.91623 \times 10^{-8}$ | |

The numerical values of each condition for each embodiment are shown in Table 5.

| | Embod. 1 | Embod. 2 | Embod. 3 | Embod. 4 |
|---|---|---|---|---|
| Cond. (1) | 5.10 | 6.40 | 5.43 | 5.70 |
| Cond. (2) | 0.41 | 0.54 | 0.46 | 0.47 |
| Cond. (3) | 2.79 | 2.94 | 4.00 | 2.94 |
| Cond. (4) | 2.29 | 2.18 | 2.35 | 2.10 |

As can be understood from Table 5, the first through fourth embodiments satisfy conditions (1) through (4). Furthermore, as can be understood from the aberration diagrams, the various aberrations are relatively well corrected.

According to the present invention, a zoom lens system having the following features can be attained:

(i) an angle-of-view exceeding 80° at the short focal length extremity;

(ii) a zoom ratio of approximately 4;

(iii) an F-number of 4 at the long focal length extremity which can be maintained constant upon zooming; and (iv) superior optical quality.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a positive first lens group, a negative second lens group, and a rear lens group that is provided on the image side of said negative second lens group, and that has a combined positive refractive power, in this order from an object,
wherein said zoom lens system satisfies the following conditions:

$$5.0 < f1/fw < 6.5$$

$$0.4 < fRt/ft < 0.55$$

wherein
f1 designates a focal length of said positive first lens group;
fw designates a focal length of the entire zoom lens system at the short focal length extremity;
fRt designates a combined focal length of the positive rear lens group at the long focal length extremity; and
ft designates a focal length of the entire zoom lens system at the long focal length extremity,
wherein said positive rear lens group comprises a positive third lens group, a negative fourth lens group, and a positive fifth lens group, in this order from the object.

2. The zoom lens system according to claim 1, satisfying the following condition:

$$2.7 < f4/f2 < 4.5$$

wherein
f4 designate a focal lengths of said negative fourth lens group; and
f2 designate a focal lengths of said negative second lens group.

3. The zoom lens system according to claim 1, satisfying the following condition:

$$2.0 < fBw/|f12w| < 2.5$$

wherein
fBw designates a back focal distance of said zoom lens system at the short focal length extremity; and
f12w designates a combined focal length of said positive first lens group and said negative second lens group at the short focal length extremity, and f12w<0.

4. The zoom lens system according to claim 1, wherein said negative second lens group comprises a negative lens element, a negative lens element, a negative lens element, a positive lens element, a negative lens element, and a positive lens element, in this order from the object.

5. The zoom lens system according to claim 1, wherein said positive fifth lens group comprises at least one lens element having an aspherical surface.

6. The zoom lens system according to claim 1, wherein said positive third lens group and said positive fifth lens group are arranged to integrally move along the optical axis direction upon zooming.

* * * * *